Patented June 3, 1952

2,599,001

UNITED STATES PATENT OFFICE 2,599,001

N,N-DISUBSTITUTED-BETA-HALO-ALKYLAMINES

James F. Kerwin and Glenn E. Ullyot, Philadelphia, Pa., assignors to Smith, Kline & French Laboratories, Philadelphia, Pa., a corporation of Pennsylvania No Drawing. Application September 2, 1950, Serial No. 183,094

6 Claims. (Cl. 260—570.7)

This invention relates to certain new chemical compounds, more particularly certain new halogen-containing amines and organic and inorganic salts thereof.

The new chemical compounds according to this invention have utility as physiologically active agents and, more particularly, have adrenolytic or sympatholytic activity.

The new compounds according to this invention have the structure shown in the following formula:

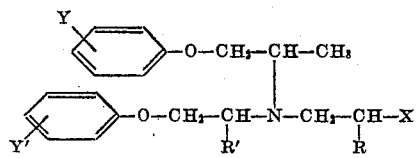

in which:

Y and Y' are members of the group consisting of hydrogen, alkyl groups containing not more than 4 carbon atoms, hydroxy, methoxy and chlorine.

R and R' are members of the group consisting of hydrogen and methyl.

X is a member of the group consisting of chlorine and bromine.

Where hereinafter the symbols Y, Y', R, R' and X are mentioned, they will indicate the substituents indicated for them in connection with the above general formula.

The organic and inorganic salts contemplated by this invention include by way of example salts of the bases formed with organic acids such, for example, as glycolic, oxalic, maleic, camphorsulfonic, etc. and inorganic acids such as, for example, sulfamic, hydrochloric, hydrobromic, sulfuric phosphoric, etc. More specifically, the inorganic and organic salts will be such as are prepared with inorganic and organic acids having an ionization constant not less than $1 \times 10^{-2}$ at 18° C.

The compounds in accordance with this invention and as identified by the above structural formula may be prepared variously by one of four general methods, from the following general description of which procedure for the preparation of all of the several compounds will be apparent to those skilled in the art.

The compounds used as starting materials for the synthesis of compounds of this invention are either known substances or, being made obvious, can be prepared by well known methods.

METHOD A

A propylene halohydrin or propylene oxide is added to the sodium salt of a phenol of the type

in refluxing alcohol to form the alcohol having the formula:

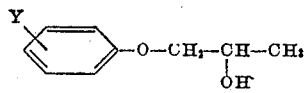

This same alcohol may also be obtained by reducing the corresponding ketone with hydrogen in the presence of a suitable halogenation catalyst, as, for example, platinum, palladium, or activated nickel (reference: Hurd & Perletz: J. A. C. S. 68, 38 (1946)).

The halide, formed by treating the alcohol with a suitable halogenating agent such as, for example, thionyl chloride, thionyl bromide, etc., is added to ethanolamine or isopropanolamine. When the resulting mixture is heated, the temperature employed depending upon the reactivity of the halide chosen, there is formed the N-substituted amino alcohol of the formula:

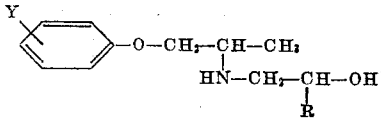

In this process it is advantageous to employ an excess of the primary amino alcohol.

The phenoxyalkyl or substituted phenoxyalkyl group is introduced into the molecule by heating together the secondary amino alcohol produced above with a phenoxyalkyl halide or substituted phenoxyalkyl halide. This may be carried out either in the presence of excess amino alcohol, or in the presence of an acid binding agent such as potassium carbonate. In most cases the reaction is conveniently carried out in a suitable solvent such as ethyl alcohol, toluene, etc., but it may be carried out without such a solvent.

Finally, the hydroxyl group of the amino alcohol

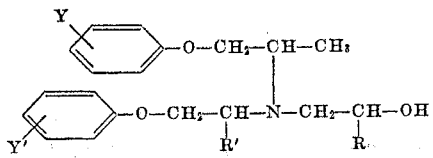

is replaced by a halogen radical X, as in the general formula above. The alcohol is reacted with a halogenating agent such as thionyl chloride or thionyl bromide to yield the product in the form of its hydrohalide salt. An excess of thionyl halide may be employed as solvent for this reaction or chloroform, benzene or other suitable solvent may be used.

METHOD B

The secondary amino alcohol produced as in Method A above may also be obtained by means of the following reaction:

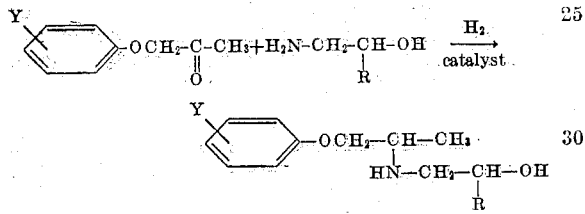

This reduction may be carried out by dissolving equimolar quantities of ketone and amine in a solvent as, for example, methyl alcohol, ethyl alcohol, cyclohexane, etc. The solution should be agitated under hydrogen pressure in the presence of a suitable hydrogenation catalyst such as platinum, palladium or activated nickel.

The amino alcohol so produced may be treated as in Method A above to introduce the phenoxyalkyl or substituted phenoxyalkyl radical and the resulting product may then be treated as in the final step in Method A to obtain the halide.

METHOD C

The ketones used as starting materials in Method B may also be used in the reaction

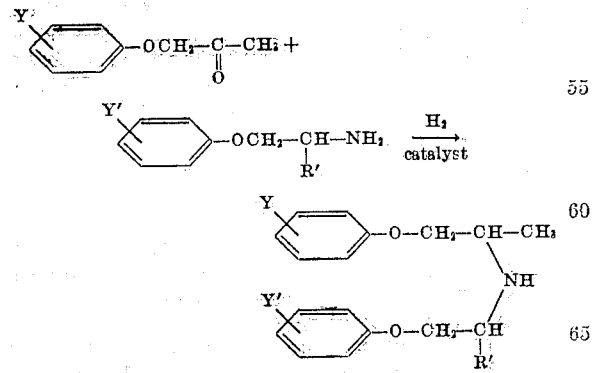

which may be carried out in the same manner as described in Method B above. The secondary amine resulting may then be reacted with ethylene or propylene halohydrin either in absence of a solvent, or in the presence of a solvent such as ethyl alcohol, benzene, toluene or xylene. Unless one employs an excess of the amine, it will be advantageous to use an acid binding agent, such as potassium carbonate, sodium bicarbonate, or magnesium oxide:

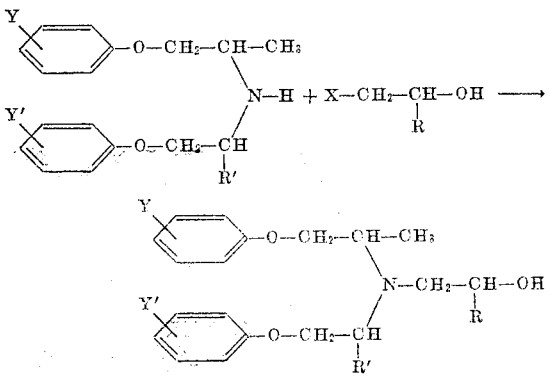

If desired, the tertiary amino alcohol may also be formed by heating the secondary amine together with an ethylene or propylene oxide; rather than utilizing the ethylene or propylene halohydrin in the reaction.

The product of this reaction may then be reacted with a thionyl halide as in Method A to replace the hydroxyl group with the halide radical.

METHOD D

The secondary amine

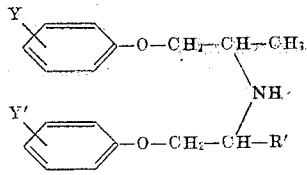

prepared in Method C above may also be made by an alternative method. This involves treating a primary amine of the type

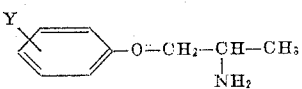

with a phenoxyalkyl or substituted phenoxyalkyl aldehyde or ketone and reducing the resulting mixture as described in Method B above. The tertiary amino alcohol is formed from the secondary amine by the use of either an alkylene halohydrin or an alkylene oxide as described in Method C, which amino alcohol is treated as in Method A to form the corresponding halide.

The following examples will be illustrative of the various types of compounds and of specific compounds in accordance with the invention and procedure for their preparation and will, it is believed, serve to make fully apparent all of the compounds embraced by the general formula given above and the preparation thereof, respectively, it being noted that the utility indicated for the several compounds flows from the elements of the general structure common to all of them.

Example 1

N - (phenoxyisopropyl) - N - phenoxyethyl-β-chlorethylamine hydrochloride:

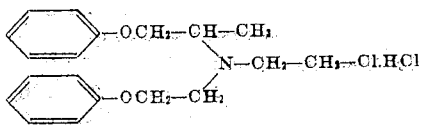

This compound will be prepared by Method A above as follows:

Step 1.—In a 500 ml. flask equipped with gas inlet tube, dropping funnel and reflux condenser is placed 139 g. of 1-phenoxy-2-propanol. A stream of dry air is bubbled through the alcohol while 55 g. of thionyl chloride is added dropwise with external cooling. The stream of dry air is continued for about six hours or until most of the hydrogen chloride has been expelled and then another 55 g. of thionyl chloride is added. The reaction mixture is allowed to stand twenty-four hours, a few drops of pyridine are added and the mixture heated four hours on the steam bath. The cooled reaction mixture is poured into water, the crude product is washed with dilute sodium bicarbonate solution and finally taken up in benzene. The benzene is distilled at ordinary pressure and the residue distilled in vacuo to yield 60–70% of 1-phenoxy-2-chloropropane, B. P. 93–94° C./5 mm.

Step 2.—To 494 g. of ethanolamine, heated to approximately 150° C. in a 500 ml. flask equipped with stirrer, condenser and dropping funnel, is added 465 g. of 1-phenoxy-2-chloropropane with mechanical stirring. The reaction mixture is then heated to reflux for three hours, cooled and poured into a liter of water. The organic layer is extracted into ether and the ether solution is extracted with dilute hydrochloric acid. The aqueous acid solution is then made alkaline with 40% sodium hydroxide solution and the organic base is extracted into ether. Removal of the ether leaves N-(phenoxyisopropyl)-ethanolamine which, after recrystallization from hexane, melts at 70.5–72° C.

A mixture of 48 g. of N-(phenoxyisopropyl)-ethanolamine and 25 g. of phenoxyethyl bromide is heated at 120° C. for three hours and then heated gradually to 145° C. over a four hour period. The cooled mixture is dissolved in 100 ml. of benzene and extracted thrice with water. Distillation of the benzene layer yields N-phenoxyisopropyl-N-(phenoxyethyl)-ethanolamine which distills at 160–167° C. at 0.2 mm.

Dry hydrogen chloride is introduced into a solution of 29 g. of the above amino alcohol in 100 ml. of dry chloroform until the solution is acid. The acidified solution is cooled while 13.4 g. of thionyl chloride is added and, after the addition is complete, heated to reflux for 1½ hours. Removal of the solvent and recrystallization of the residue from alcohol and ether gives N-phenoxyisopropyl-N-phenoxyethyl-$\beta$-chlorethylamine hydrochloride which melts at 99.5–100.5 C.

Example 2

N,N-bis-(phenoxyisopropyl-$\beta$-chlorethylamine hydrochloride:

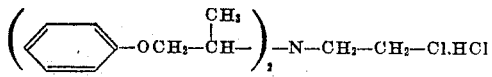

This compound will be prepared by Method C described above. 24 g. of phenoxyacetone and 24 g. of $\beta$-phenoxyisopropylamine are heated at 110–120° C. for 2 hours. The ketimine thus formed is dissolved in alcohol and hydrogenated with platinum catalysts at three atmospheres and 65° C. The catalysts and solvent are removed and the residue redistilled to recover bis-($\beta$-phenoxyisopropyl)-amine, B. P. 160–162° C. at 0.2–0.3 mm.

28 g. of the secondary amine, 1.8 g. of water and 8.8 g. of ethylene oxide are heated under pressure at 150° for six hours. The reaction mixture is taken up in ether, dried and distilled to yield bis-($\beta$-phenoxyisopropyl)-aminoethanol.

2 g. of bis-($\beta$-phenoxyisopropyl)-aminoethanol and 0.7 g. of thionyl chloride in 25 ml. of chloroform are refluxed for one-half hour and the solvent is evaporated under reduced pressure, leaving N,N-bis-($\beta$-phenoxyisopropyl)-$\beta$-chlorethylamine hydrochloride as an oily residue. The free base is formed by treating the hydrochloride with aqueous sodium bicarbonate solution and extracting with ether. A crystalline sulfate salt, M. P. 165–168.5° C. is formed by adding sulfuric acid to the ether solution of the base.

Example 3

N-(o-methylphenoxyisopropyl)-N-phenoxyethyl-$\beta$-chloroethylamine hydrochloride:

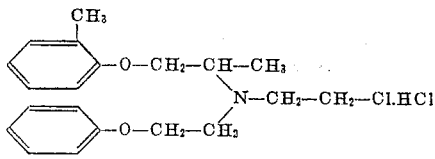

One mole of o-cresol and 300 ml. of alcohol are placed in a flask fitted with stirrer, reflux condenser and dropping funnel. A solution of 40 g. of sodium hydroxide in 40 ml. of water is added, the solution of sodium o-cresoate is heated to refluxing and one mole of propylene chlorohydrin is added with stirring over a two hour period. After the addition is complete, the reaction mixture is refluxed an additional five hours. Most of the alcohol is removed by distillation under diminished pressure, the residue is dissolved in benzene and washed several times with water and then with 10% sodium hydroxide solution. The benzene is then distilled and the residue is distilled in vacuo. 1-(o-methylphenoxy)-2-propanol distills at 86–88° C./2 mm. The p-nitrobenzoate ester melts at 95.5–96° C.

The end product is formed from 1-(o-methylphenoxy)-2-propanol as in the manner described under Example 1 by halogenation with thionyl chloride to form 1-(o-methylphenoxy)-2-chloropropane, B. P. 94–95° C./3 mm., which, in turn, is reacted with ethanolamine to form the secondary amino alcohol N-(o-methylphenoxy-isopropyl)-ethanolamine, M. P. 57.5–59° C. The phenoxyethyl group is introduced by heating the secondary amino alcohol with phenoxyethyl bromide as in Example 1. The resulting tertiary amino alcohol is then treated with thionyl chloride to produce N-(o-methylphenoxyisopropyl)-N-phenoxyethyl-$\beta$-chloroethylamine hydrochloride.

Example 4

N-(p-isopropylphenoxyisopropyl)-N-(o-methylphenoxyethyl)-$\beta$-chlorethylamine hydrochloride:

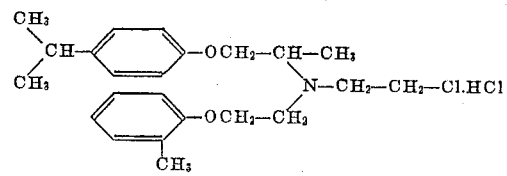

In this preparation the procedure of Example 3 will be followed using as a starting material p-isopropylphenol in place of o-cresol. The phenol is converted by means of sodium hydroxide to the sodium salt which is refluxed with propylene chlorohydrin to obtain p-isopropylphenoxy isopropanol.

The product N-(p-isopropylphenoxyisopropyl)-ethanolamine is formed in the same manner as described in Example 1 by halogenation of the p-isopropylphenoxyisopropanol with thionyl chloride to form p-isopropylphenoxy isopropyl chloride which is reacted with ethanolamine to form the secondary amino alcohol. The secondary amino alcohol will be reacted with o-methylphenoxyethyl bromide in place of phenoxyethyl bromide in the same manner as described under Example 1. The final step, halogenation with thionyl chloride is conducted as described above to convert the resulting tertiary amino alcohol to N-(p-isopropylphenoxyisopropyl)-N-(o-methylphenoxyethyl)-β-chlorethylamine hydrochloride.

*Example 5*

N-(phenoxyisopropyl)-N-(m-hydroxyphenoxyethyl)-β-chlorethylamine hydrochloride:

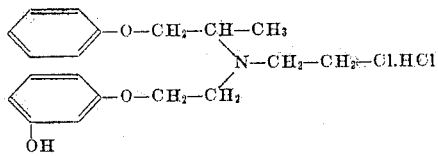

N-(phenoxyisopropyl)-ethanolamine is formed as an intermediate in the procedure of Example 1. An excess of this compound is reacted with m-hydroxyphenoxyethyl bromide in place of phenoxyethyl bromide as described in Example 1. The resulting tertiary amino alcohol is treated with thionyl chloride to produce N-(phenoxyisopropyl)-N-(m-hydroxyphenoxyethyl)-β-chlorethylamine hydrochloride.

*Example 6*

N-(phenoxyisopropyl)-N-(o-methoxyphenoxyethyl)-β-chlorethylamine hydrochloride:

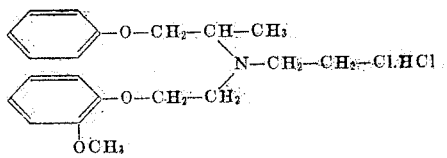

N-(phenoxyisopropyl)-ethanolamine is formed as an intermediate in the procedure of Example 1. This compound is reacted with o-methoxyphenoxyethyl bromide in place of phenoxyethyl bromide as described in Example 1. The resulting tertiary amino alcohol is treated with thionyl chloride to produce N-(phenoxyisopropyl)-N-(o-methoxyphenoxyethyl)-β-chlorethylamine hydrochloride.

*Example 7*

N-(phenoxyisopropyl)-N-(p-chlorophenoxyethyl)-β-chlorethylamine hydrochloride:

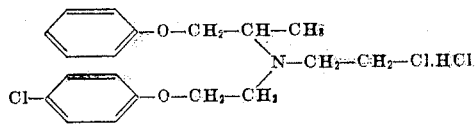

N-(phenoxyisopropyl)-ethanolamine is formed as an intermediate in the procedure of Example 1. This compound is reacted with p-chlorophenoxyethyl chloride in place of phenoxyethyl bromide as described in Example 1. The resulting tertiary amino alcohol is treated with thionyl chloride to produce N-(phenoxyisopropyl)-N-(p-chlorophenoxyethyl)-β-chlorethylamine hydrochloride.

*Example 8*

N-(o-sec-butylphenoxyisopropyl)-N-phenoxyethyl-β-chloroethylamine hydrochloride:

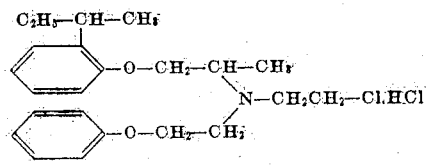

The procedure of Example 1 will be followed in the preparation of this compound, replacing the 1-phenoxy-2-propanol with an equimolar amount of 1-(o-sec.-butyl phenoxy)-2-propanol as a starting material. The halide, B. P. 118–124° C./4 mm., of this alcohol, which is formed by reaction with thionyl chloride, is reacted with ethanolamine to form the secondary amino alcohol 1-(o-sec. butyl phenoxy)-2-propyl ethanolamine, M. P. 69.5–71.5° C. The introduction of the phenoxyethyl group is accomplished as described in Example 1 by reacting the secondary amino alcohol with phenoxyethyl bromide. The resulting tertiary amino alcohol is converted to the halide by reaction with thionyl chloride.

*Example 9*

N-phenoxyisopropyl-N-phenoxyethyl-1-amino-2-chloropropane hydrochloride:

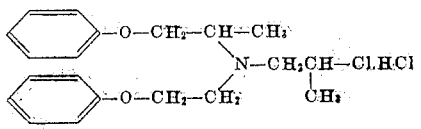

In the preparation of this compound, the 1-phenoxyisopropyl-2-chloropropane is reacted with isopropanolamine, instead of ethanolamine, under the conditions described in Example 1. The resulting secondary amino alcohol, M. P. 69–71° C. is treated with phenoxyethyl bromide to prepare the N-phenoxyethyl derivative. The resulting tertiary amino alcohol is converted to the halide by treatment with thionyl chloride.

*Example 10*

N-phenoxyisopropyl-N-(m-methoxyphenoxyisopropyl)-β-chloroethylamine hydrochloride:

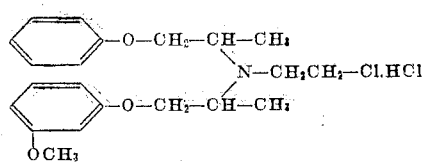

Equimolar amounts of β-phenoxyisopropylamine and m-methoxyphenoxyacetone are heated at 110–120° C. until the water formed is driven off. The reaction mixture is then diluted with alcohol and subjected to catalytic hydrogenation with platinum catalyst at 3 atmospheres pressure and 65° C. The secondary amine thus formed is recovered by distillation after removing the catalyst and solvent. Heating the secondary amine with an excess of ethylene oxide under pressure at 150° as described in Example 2, introduces the N-(β-hydroxyethyl) group. The product is distilled and then treated with thionyl chloride in chloroform solution to form N-phenoxyisopropyl-N-(m-methoxyphenoxyisopropyl)-β-chloroethylamine hydrochloride.

Example 11

N-phenoxyisopropyl - N - (o-methylphenoxyisopropyl)-β-chloroethylamine hydrochloride:

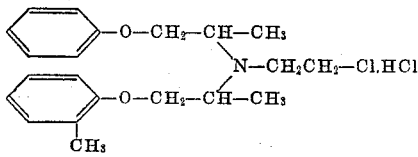

This compound is prepared in the same manner as Examples 2 and 10. β-phenoxyisopropylamine and o-methylphenoxyacetone are heated together at 110-120° to form the ketimine which is then reduced catalytically over platinum catalyst. The secondary amine is heated under pressure with ethylene oxide and the resulting tertiary amino alcohol is reacted with thionyl chloride in chloroform solution to form the end product.

Example 12

N-phenoxyisopropyl-N-phenoxyethyl - β - bromoethylamine hydrochloride:

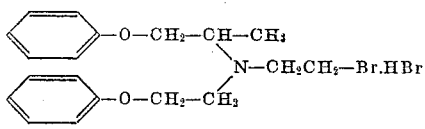

N - phenoxyisopropyl - N - (phenoxyethyl) - ethanolamine, an intermediate in the preparation of Example 1, is dissolved in chloroform and dry hydrogen bromide is introduced until the solution is acid. Then a slight excess of thionyl bromide is added and the solution is refluxed for one hour. Removal of the solvent leaves N-(phenoxyisopropyl)-N-(phenoxyethyl) - β - bromoethylamine hydrobromide which is recrystallized from alcohol and ether.

Example 13

N, N-bis-(phenoxyisopropyl) - β-bromoethylamine hydrobromide:

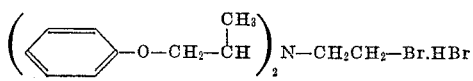

N, N-bis-(phenoxyisopropyl)-aminoethanol, an intermediate in the preparation of Example 2, is treated with thionyl bromide in chloroform solution as described in Example 12.

In the foregoing examples hydrochlorides and hydrobromides according to this invention are exemplified. However, it will be understood and readily appreciated by those skilled in the art that the foregoing examples will illustrate the structure of organic or inorganic salts generally and will serve as specific examples of those organic and inorganic salts heretofore mentioned specifically by the writing in the several foregoing illustrative structures of the chemical symbols for the several acid groups heretofore specifically mentioned or of the acid group of any other desired organic or inorganic acid for the HCl or HBr in the several foregoing examples, respectively.

It will similarly be self-evident to those skilled in the art that in the foregoing examples illustrative of the production of chloride hydrochlorides by the procedures described, bromide hydrobromides will be produced with the use, for example, of thionyl bromide in place of thionyl chloride in the final step. Thus, the foregoing specific examples of chloride hydrochlorides serve as specific examples of bromide hydrobromides by simply replacing Cl.HCl in the several formulae with Br.HBr.

The foregoing examples illustrate the salts contemplated by this invention. The bases contemplated by this invention according to the broad and more particular structural formulae herein disclosed are specifically exemplified as will be obvious to anyone skilled in the art by reference to the foregoing specific examples with the removal from the structures illustrated thereby of the acid group, i. e., HCl or HBr.

As will be apparent, the organic and inorganic salts contemplated by this invention will be prepared from the bases in a manner usual and well known to those skilled in the art, as by neutralizing the bases with organic or inorganic acids.

The bases contemplated by this invention will be formed by carefully interacting the salts contemplated by this invention and herein exhaustively exemplified with one molecular equivalent of a strong alkali such, for example, as sodium hydroxide, potassium hydroxide, lithium hydroxide, or the like, in aqueous solution say, for example, a 1-10% solution at room temperature or below and the bases so liberated are isolated with the aid of a water-immiscible solvent such as ether or benzene. The preparation of free bases from salts is illustrated under Example 1.

The compounds contemplated by this invention will be variously optically inactive or optically active and it will be understood that the optically inactive and optically active forms of the compounds contemplated by this invention are all included within the scope of this invention.

The various types of compounds having the structure embodying this invention as illustrated by the above specific examples and examples of the various types of compounds will be readily prepared by the general methods of preparation described above as exemplified by the description of the preparation of the several specific examples. The starting material for the preparation of any given compound within the structure contemplated by this invention will be found among known compounds, or, its structure being obvious with reference to any particular compound desired to be prepared, will be readily prepared by known methods.

This application is a continuation-in-part of application filed by us Serial No. 97,926, filed June 8, 1949, now abandoned.

What is claimed is:

1. A compound of the class consisting of a free base and its acid addition salts, the free base having the formula:

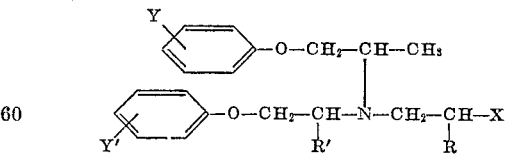

in which Y and Y' are members of the group consisting of hydrogen, alkyl groups containing not more than 4 carbon atoms, hydroxy, methoxy, and chlorine; R and R' are members of the group consisting of hydrogen and methyl; and X is a member of the group consisting of chlorine and bromine.

2. The compound having the structure:

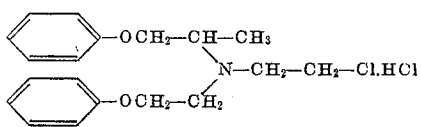

3. The compound having the structure:
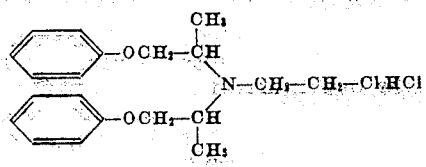
4. The compound having the structure:
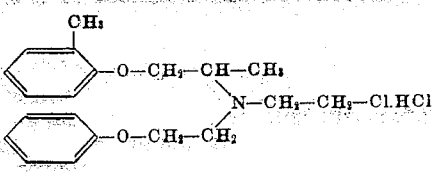
5. The compound having the structure:
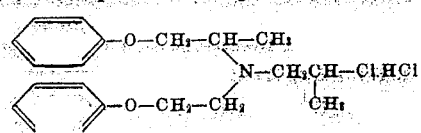
6. The compound having the structure:
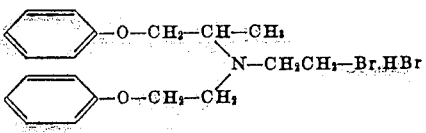
JAMES F. KERWIN.
GLENN E. ULLYOT.
REFERENCES CITED
The following references are of record in the file of this patent:
UNITED STATES PATENTS
| Number | Name | Date |
|---|---|---|
| 2,495,772 | Rieveschl et al. | Jan. 31, 1950 |